United States Patent
Schneider

[15] 3,647,544
[45] Mar. 7, 1972

[54] BATTERY PLATE HAVING DUAL POROSITY

[72] Inventor: Friedrich August Schneider, Nuenen, Netherlands

[73] Assignee: The International Nickel Company, Inc., New York, N.Y.

[22] Filed: Nov. 24, 1969

[21] Appl. No.: 879,600

Related U.S. Application Data

[63] Continuation-in-part of Ser. No. 707,312, Feb. 21, 1968, abandoned, Continuation-in-part of Ser. No. 809,423, Mar. 21, 1969, abandoned.

[30] Foreign Application Priority Data

Apr. 5, 1968 Great Britain......................16,585/68

[52] U.S. Cl.....................................136/24, 136/28, 136/30
[51] Int. Cl........................................................H01m 43/04
[58] Field of Search......................136/38, 36, 56, 64, 24, 28, 136/29, 30, 31, 120

[56] References Cited

UNITED STATES PATENTS

| | | | |
|---|---|---|---|
| 3,050,576 | 8/1962 | Comdnor | 136/24 |
| 3,069,486 | 12/1962 | Solomon et al. | 136/30 |
| 3,099,899 | 8/1963 | Horn et al. | 136/57 |
| 3,174,219 | 3/1965 | Horn et al. | 136/57 |
| 3,262,815 | 7/1966 | Langer et al. | 136/36 |
| 3,311,505 | 3/1967 | Paget | 136/28 |
| 3,326,721 | 6/1967 | Henderson et al. | 136/24 |
| 3,493,434 | 2/1970 | Goodkin | 136/30 |
| 2,384,463 | 9/1945 | Gunn et al. | 136/86 R |
| 3,447,969 | 6/1969 | Tudor et al. | 136/26 |

*Primary Examiner*—Allen B. Curtis
*Assistant Examiner*—C. F. Lefevour
*Attorney*—Maurice L. Pinel

[57] ABSTRACT

Directed to the production of battery plates having dual porosity and having a plurality of expanded metal grids electrically connected in parallel with the grids having a porous galvanically active material such as cadmium adhering thereto, the larger pores formed by pockets in the expanded metal communicating with finer pores in the porous metal surrounding the pockets and with a greater proportion of the galvanically active material being placed in the interior of the plate, and to bipolar plates so produced.

8 Claims, No Drawings

BATTERY PLATE HAVING DUAL POROSITY

The present application is a continuation-in-part of my prior U.S. Pat. applications, Ser. No. 707,312 filed Feb. 21, 1968 now abandoned and Ser. No. 809,423 filed Mar. 21, 1969 now abandoned.

The present invention is concerned with the manufacture of battery plates, and is of special value in the manufacture of thick negative cadmium plates for use in nickel-cadmium alkaline accumulators. Positive plates for nickel-cadmium alkaline accumulators can advantageously consist of sintered nickel reinforced by a nickel grid formed by expanding an electroformed nickel sheet. This technique of "expansion" of thin sheet is applicable to other metals than nickel, and is of value in making plates other than these positive plates. Thus, in nickel-cadmium alkaline accumulators, negative plates are usually pocket plates, which may be made from perforated steel ribbon (as in the Jungner type of cell) which has been nickel-plated and annealed in hydrogen. The pockets are filled with cadmium oxide CdO or cadmium hydroxide $Cd(OH)_2$, which is thereafter electrolytically reduced to metallic cadmium in a spongy form. Such a plate, however, does not match the characteristics of a sintered positive plate, and its life in terms of cycles of charge and discharge is appreciably less than that of a sintered positive plate. Numerous attempts have been made to manufacture a negative sintered plate by depositing a thin film of metallic cadmium onto the internal surfaces of a porous body of sintered copper, but these have not been fully successful. The life of such a plate is even less than that of a pocket plate of the same thickness, since in the sintered plate already during impregnation the cadmium is preferably deposited in the outer layers of the plate. It is impossible to coat the porous body of the plate with cadmium satisfactorily, and consequently it has proved impossible to reverse the action of an accumulator containing such negative plates without bringing copper into the electrolyte, and this is detrimental to the operation of the accumulator. Again, the action of the electrochemical processes used to form the active mass within the fine pores of a sintered plate is slow, and the number of times that the plate has to be immersed in the various solutions to produce an acceptable deposit mass in the form of cadmium hydroxide is large, so that the manufacture of these sintered plates is expensive.

If a nickel-cadmium alkaline accumulator of high capacity per unit volume of plate is to be economically constructed, it is desirable that the plates should be thick, provided that the accumulator is not required to give very high discharge rates. A sintered nickel positive plate may be about 4 mm. thick, but in a sintered negative plate of this thickness it is very difficult to retain the cadmium in the innermost parts of the porous body. Thick negative cadmium plates according to the invention have characteristics, including a life in terms of cycles of charge and discharge, which match or at least substantially match those of a thick positive plate of sintered nickel.

According to this invention, a plate is formed from a pack of electroformed expanded metal grids. The thickness of the basic metal sheet with expanded grids is about 25 to about 100 microns. The width of the rectangular openings in the grid in the expanded state is between about 1×1 millimeters and 2.5×2.5 millimeters. The distance between lattice peaks of the grid after expansion is about 0.3 to about 0.6 millimeters. The grids are conductively joined together in parallel, each grid carrying an adherent porous layer of metal which does not completely fill the rectangular openings of the expanded metal grid, which may itself be a galvanically active material or which may be impregnated with a galvanically active material, e.g., porous nickel impregnated with active nickel oxide, or partially transformed to active nickel oxide by anodic treatment.

The metal grids may be made of any metal which is stable in the electrolyte in which the plate is to be used. After the expansion operation each grid is preferably plated with the base metal of which it is constructed in order to fix the expanded grid and give it enchanced rigidity. A plate can be built up to the desired thickness by the use of a suitable number of grids, and the grids are preferably joined and electrically interconnected by welding around their edges.

The adherent porous layer of metal should preferably be deposited on the individual expanded metal grids prior to joining them together to form a plate. If this practice is not followed, it is impossible to grade the concentration of the active material from the center of the plate to the outer layers at will.

Migration of the deposited metal from the center outwards is diminished if the grids are of highly conducting metal, so that there is equipotentiality along the surface of each grid as current is drawn from or fed to the plate. This means also that the electrochemical process will proceed deeper in the plate. Equipotentiality cannot be obtained in sintered plates because the difference in specific conductivity between the compact grid metal and the porous sinter is large, being of the order of magnitude of at least 10:1.

Further, a plate according to the invention has a dual-porosity structure throughout. Large pores within the plate are provided by the expanded metal pockets which are formed when the grids with their wide rectangular openings are arranged into a pack. A fine pore structure is provided within the porous layer of metal itself, which adheres to the walls of the large pores. The dual-porosity structure of such a plate allows the electrolyte to penetrate readily into the large pores and from these the penetration proceeds into the fine pores within the porous metal. The large pores are provided within each grid due to the fact that the rectangular openings in the initial expanded metal are not completely filled with active material. In this way large pores having a pore size sufficient to permit ready penetration of electrolyte and generally having pore diameters between about 0.1 or 0.2 and 0.8 millimeter are provided at the center of each opening in the grid. The porous active material surrounding the large pores and bonded to the metal of the grid contain a fine pore size in which the average diameter of the fine pores is between about 2 and about 30 microns. In this way the mean ratio of pore size between the fine pores and the large pores is about 1:40. The electrochemical action is carried actively throughout the entire plate by a labyrinth of large pores from which fine pores radiate in all directions. This dual porosity also reduces migration of the deposited metal because it allows the electrochemical action to proceed deeper in the plate during charge and discharge than in sintered plates with their single fine-pore structure.

Advantageously, the inner grids in a plate are provided with a greater thickness of deposited metal than are the outer grids, so that the thickness of the deposited metal is graded from the inside of the plate toward the outside. Such a grading of the thickness of the deposited metal largely compensates for any remaining migration of the metal from the center outwards that does occur, and the danger of the deposited metal being entirely removed from the center of the plate is reduced or even eliminated. Thus, the inner parts of the plate do not become inactive; accordingly, the plate has a good life, in terms of cycles of charge and discharge.

In short summary, plates according to the invention show better current distribution inside the plate, and reduced migration of the active deposited material (and thus better charge and discharge characteristics and cycle life) than do conventional constructions of plate.

The invention is applicable to the manufacture of zinc plates in which case the grids are preferably of zinc-plated expanded nickel and the deposited metal is zinc. Zinc can be deposited in porous form from a solution of potassium zincate, for example, a solution of 25 to 30 g./l of zinc oxide in 25 percent by weight aqueous potassium hydroxide, at room temperature, using 1 $A/dm^2$ cathodic current density. The invention can also be used for the manufacture of nickel plates, nickel powder being readily sintered onto expanded nickel grids. Such nickel grids can readily be transformed into grids bearing active nickel oxide NiO(OH), and nickel oxide electrodes then formed from a pack of such grids. The porous sintered layer of nickel is preferably transformed to active nickel oxide by cathodic impregnation with nickel hydroxide from concentrated nickel nitrate solution (McHenry process) followed by cycling in a concentrated solution of potassium carbonate (Okinaka process).

In order to save as much nickel as possible, a multilayer plate may be built up from a number of expanded nickel grids or mesh, each of which is covered with nickel powder and sintered at about 500° C. The grids or mesh are then assembled and given a further sintering at a higher temperature, about 700° C. This provides a strongly bonded porous nickel plaque which is then provided with active mass, NiO(OH), preferably by combined anodic oxidation in $NaHCO_3$ followed by treatment in $K_2CO_3$ as described in the specification filed on my copending U.S. Pat. application Ser. No. 733,324 filed May 31, 1968, which is now U.S. Pat. No. 3,523,828, issued Aug. 11, 1970.

A cadmium plate according to the invention is preferably based on grids of copper. An electroformed copper sheet from 30 to 50 microns thick can be expanded to an overall thickness of about 0.5 mm., and three such sheets may then be formed into a pack about 1 mm. thick. If the plate is to be 4 mm. thick, thirteen such sheets may be formed into a pack.

I prefer to deposit the cadmium metal onto the expanded metal grids in the form of cadmium sponge, most advantageously after depositing a layer of hard cadmium plate electrolytically from a cyanide or fluoborate bath. The subsequent deposition of the cadmium sponge may be effected in various known ways. For example, cadmium oxide may be formed into paste which is pressed into the grid and dried, the oxide being cathodically converted to cadmium sponge in a potassium hydroxide solution, as described in U.S. Pat. No. 2,616,939. Again, the grid may be immersed in an aqueous solution of cadmium chloride and excess of chloride ions and made the cathode while a current is passed as described in U.K. specification, No. 1,061,463. Yet again, the grid may be immersed in a solution of $CdSO_4$ and made the cathode while a current is passed between it and a cadmium anode. It is important to avoid any oxidation of the cadmium sponge during washing and drying, and not to heat above 80° to 90° C. It is also important when any of the foregoing methods for depositing porous cadmium metal are employed that automatically large pores are provided in the center of each of the grid openings surrounded by a network of fine pores in the porous cadmium metal, because the deposition of metal sponge always starts from the expanded metal grid surface.

It is known that if certain metals are codeposited with cadmium to give a deposit that is in effect a cadmium-rich alloy beneficial results are obtained. Thus, nickel up to 20 percent by weight of the cadmium sponge retards crystal growth, and very small quantities of such other metals as thallium, selenium and silver increase the mobility of the cadmium ions in cadmium hydroxide and so allow deeper discharge of the plate. Any such metal may be codeposited with the cadmium by the introduction of ions of the metal into the electrolyte and the use of an additional anode of the metal, the proportion of this metal deposited being easily controlled by adjustment of the currents passed through the different anodes.

The assembly of the plate from a pack of grids involves the compression of the edges of the grids together followed, for example, by spot welding of the edges to make electrical contact between them. The outer surfaces of a pack of grids may be protected during this compression by sandwiching the pack between two sheets of thin electro-formed slotted copper sheet, for example, 0.1 mm. thick, plated with a thin layer, for example, 3 to 5 microns thick, of cadmium. A suitable slotted sheet has a free surface area of 40 percent, a slot size of 0.32×1.92 mm. and a weight of 460 $g./m.^2$. The slots are rectangular, and are staggered so as not to weaken the sheet unduly. The electroplating is carried out by electrodeposition of cadmium from one electrode only on one side of the sheet, so that the slots in the plated sheet are larger on one side of the sheet than on the other, i.e., have a bellmouth shape. The pack of grids is sandwiched between two sheets, each of which is arranged so that the larger sides of the slots are outwards, (i.e., so that the bellmouth faces outwards) and the pack then welded together so that the sheets form an integral part of the plate.

An alternative method of protecting the outer surfaces of a pack of grids during compression is to place on each surface a fabric of synthetic monofilament and then cover this with a cadmium-plated copper wire mesh or screen. The fabric may be, for example, of nylon with square meshes, a mesh width of 330 microns and a thread thickness of 44 microns giving a free surface area of 46 percent. The wire mesh may have, for example, square meshes 2 mm. wide, and a wire thickness of 0.25 mm. giving a free surface area of 74 percent. The fabric should be slightly smaller than the size of the grids, and the wire mesh the same size as the grids, so that when the edges of the pack are compressed and welded together, the mesh forms an integral part of the plate, and the fabric is totally included in the plate.

It is desirable that the porous layer of cadmium in each grid should be protected in some way until the grids are in use in a plate in a cell. This may be done by coating each grid after preparation and before welding into a pack with a polymeric composition which will prevent oxidation of the porous layer, but which will be destroyed when the plate is put into service. Suitable polymeric compositions are the vinyl acetate-crotonic acid copolymers wholly or partly neutralized with organic amines which are available in the form of aerosol sprays for use as hair lacquers; such compositions can be simply sprayed onto the prepared grids and dried, and are automatically removed in alkaline solution during the first cycle of charge and discharge of a cell incorporating such grids. Some Examples will now be given:

EXAMPLE I

A plate 1 mm. thick was built up from three expanded electroformed copper grids. Each grid was produced by expanding sheet from 30 to 50 microns thick, and after the sheet was expanded the distance between lattice peaks was about 0.4 mm. The dimensions of the rectangular openings in the expanded mesh were 1.4×1.7 millimeters. The expanded grid was plated with copper to give sheet thickness of 100 to 120 microns, and its overall thickness was about 0.5 mm. Each grid was plated with a cadmium layer from 3 to 5 microns thick deposited from a standard cyanide bath having the composition 100 g./l NaCN and 23 g/l CdO and operated at a room temperature of 25° C. The grid was immersed in the bath as the cathode and a current density of 2 amps per $dm^2$ of actual grid surface passed. Each grid was then given a deposit of cadmium sponge by the method of U.K. specification, No. 1,061,463. The weight of the deposit on each outer grid of the plate was 5 $g./dm^2$ of its geometrical surface and that on the inner grid was 7.5 $g./dm^2$ of its geometrical surface. The cadmium sponge filled the rectangular openings of the expanded metal grid only incompletely, leaving large pores having an average pore diameter of about 0.2 to about 0.4 millimeter at the center of each of the grid openings. The average pore size in the porous cadmium metal was about 2 to about 20 microns. The total cadmium sponge deposited was 17.5 $g./dm^2$. The three grids were then compressed together and spot-welded along their edges. The plate so formed had a capacity of 3.5 ampere hours per $dm^2$.

EXAMPLE II

A plate of 4 mm. thickness was built up from 13 expanded electroformed copper grids as described in Example I. The deposit of cadmium sponge was graded on the respective grids from the center to the outside of the plate, the weight of the deposit on the center grid being 5$g./dm^2$. On each side the weights of the deposit on successive grids were 4, 3.5, 3.5, 3, 2.5 and 2.5 $g./dm^2$, the total weight of cadmium on the plate being 43 g.

The capacity of the plate was 12 ampere hours per dm.², 0.28 ampere hours per gram of cadmium sponge. The porosity of the 4 mm. plate was found to be 80 percent prior to the deposition of the cadmium sponge, which is at least as high as that of the best sintered plate.

EXAMPLE III

A plate of 3 mm. thickness was built up from nine expanded electroformed copper grids as described in Example I. The cadmium sponge was deposited under modified conditions and contained 1.7 percent nickel. The bath was buffered with a borax buffer at pH 6 and contained 62 g./l $CdCl_2 \cdot H_2O$, 90 g./l KCl, 12 g./l $H_3BO_3$, 0.5 g./l $Na_2B_4O_7$ and 7.2 g./l $NiCl_2 \cdot 6H_2O$. The temperature was 55° C. The anodic current was divided into a Cd and a Ni-circuit. The ratio of the anodic Cd-current to the Ni-current and the Cd-anode surface area to the Ni-anode surface area was 4:1. The cathodic current density was 4 A/dm.² of actual metal surface of the expanded cadmium plated copper grid. The total anodic current density was 1 A/dm². After deposition, the sponge was slightly compressed on each grid between two plastic plates and then the grids were washed till the rinsing water was free of chloride ions. The rinsed grids were immediately placed in a drying oven at 80° C. The dry grids were cooled to room temperature and immediately carefully sprayed with a high quality aerosol hairspray. The deposit of the sponge on the nine grids was graded from one outer grid to the other, the weight of the deposit on the successive grids being 1, 3, 4, 5, 5, 4, 3 and 1 g./dm².

The pack of the nine grids was covered on each side with a slotted cadmium plated copper sheet. The slotted copper sheet was electroformed, the cross section of the slots being bellmouth shaped and the wide side of the bellmouth directed to the outside of the final plate. The thickness of the slotted sheet was 0.1 mm., the weight 160 g./m², the free surface area 40 percent, and the size of the slots 0.32×1.92 mm. The slots were oblongs in a staggered arrangement. The thickness of the Cd-plating was 3 to 5 microns.

Finally the pack was compressed in a mould to a 3 mm. thick plate, with highly compressed edges which were joined by spot welding.

The plate thus formed contained 31 g. of cadmium sponge per dm.² and had a 5 hour capacity of 10 ampere hours per dm.² or 0.33 ampere hours per gram of cadmium. This is some 50 percent greater than the value previously obtained for cadmium-impregnated sintered metal plates.

EXAMPLE IV

A plate of 3 mm. thickness was built up from nine expanded electroformed copper grids as described in Example I. The grids were covered with cadmium sponge as described in Example III.

The pack of the nine grids was first covered on each side with a monofil nylon fabric, 5 mm. smaller in dimension than the pack. The mesh width of the square meshes was 330 microns, the thickness of the nylon thread was 136 microns. The open surface area of the nylon fabric was 47 percent.

Finally both sides of the pack were covered with a cadmium-plated copper wire mesh which had the same dimensions as the pack. The mesh width of the square meshes was 2 mm., the wire diameter 0.25 mm., the thickness of the cadmium plating 4 microns. The free surface area of the copper wire mesh was 74 percent.

The complete pack was then converted to a 3 mm. thick plate as described in Example III. Thus, the dimensions, the cadmium sponge content and the capacity of the finished plate were equal to those of the plate of Example III.

Battery plates in accordance with the present invention provide path lengths in the fine porous system of the plate of about the same order as those which occur in thin plates only about 0.5 to about 1 millimeter thick. In addition, the biporous multilayer plates are extremely strong and due to the low number of plates required in each cell the plate distance can be increased to about 0.7 to about 1 millimeter, thus allowing for the use of very rigid separators with a very large free surface area such, for example, as corrugated and perforated polyvinyl chloride sheets. The result is a cell combining excellent charge and discharge characteristics with the rigidity and reliability of the old Edison cell.

The invention is also of particular applicability to the production of electrodes for use in bipolar nickel-zinc batteries and thereby solves a problem of long standing in the art as applied thereto.

Nickel-zinc accumulators, formed from electrodes of nickel and zinc in alkaline solution, are well known. Using thick sintered nickel plates impregnated with nickel oxide or zinc metal, and with suitable additions of boric acid to the electrolyte, a capacity of about 0.5 ampere hour per gram of zinc can be obtained. Such accumulators, however, do not have good characteristics at a high rate of discharge because the voluminous discharge products of the zinc combined with the very fine pores of the nickel sinter prevent electrochemical action taking place to any depth in the plate. Even under optimum conditions and with each negative zinc plate surrounded by an alkali-resistant microporous rubber bag open at its top end only, a life of 100 to 130 cycles of complete charge and discharge at most can be obtained because it is impossible in practice to prevent buildup of dendritic zinc sponge leading to short circuiting of the cell.

There are two principal ways in which this buildup occurs; firstly, zinc sponge forms between the lugs of the negative plates and the top of the positive plates (over the top of a microporous bag if this is present), and secondly, in each discharge cycle, relatively dense zincate solution accumulates in the bottom of each cell and this increases the danger of zinc-dendrite formation at the lowest part of the zinc plate and through the widest pores of a microporous bag, if this is present, leading also to short circuiting and failure of the cell. This last effect is particularly experienced in traction batteries which are usually tall with a small cross section to obtain optimum performance per unit of weight and volume.

These disadvantages can be overcome to a large extent by use of bipolar plates, with a biporous pore structure. A cell incorporating such plates has the following advantages:

1. At all charge and discharge currents there is always a homogeneous current distribution over the total plate surface. Thus, local high current densities encountered in standard batteries are avoided.
2. The positive half of the cell can be completely separated from the negative half by a suitable separator. Thus, short circuiting by zinc-sponge formation from a negative to a positive plate is impossible. Separators can be made from organic material such as very fine homoporous polyvinyl chloride sheet and polystyrene membrane, or from inorganic materials such as zirconyl phosphate membrane, all of which materials have the ability at least partially to retain $Zn^{2+}$ ions in the negative cell compartment, because they act as molecular sieves and/or ion exchange membranes and yet have specific resistances low enough for good cell characteristics.
3. The height of the plates can be chosen to be from one half to two thirds of their width, without substantial losses in performance per unit of volume and weight because the construction avoids plate lugs, terminals and cell connectors. Thus, dangerous accumulation of zinc ions at the bottom of the cell in each cycle can be reduced by up to one third in comparison with standard cell constructions. In the past, batteries have been proposed from cells incorporating bipolar plates by clamping techniques as developed for filter press systems. In theory, an advantage of this method is that a defective cell can be replaced without destroying the battery. However, in practice, replacement of one cell always means that all cells have to be removed, cleaned and provided with new seals before the new cell can be installed, to avoid leakages at unforeseen places in the battery. This is an unpleasant and expansive job. Furthermore, the clamping systems are heavy and take up much of the space otherwise saved by the use of cells with bipolar plates. In the past, attempts to seal plates into a battery to avoid the use of clamping systems have not been successful. Recently it has been found, however, that glass-fiber-reinforced castable epoxy resins with resistance to concentrated alkali and good mechanical properties, combined with shrinkage during cold setting of the order of one part per thousand only, offer a practical solution to the sealing problem. Defective cells can be simply sawn out, and new cells glued or cast in their place. Interest in bipolar plates for Ni-Zn or Ni-air systems has been reawakened.

According to this invention, a bipolar plate for use in a nickel-zinc accumulator is formed from a negative part comprising a pack of electroformed expanded metal grids conductively joined together in parallel and each carrying an adherent porous layer of zinc metal, and a positive part comprising a pack of electroformed expanded metal grids conductively joined together in parallel and each carrying an adherent porous layer of nickel coated with active nickel oxide formed, e.g., by at least partial oxidation to active nickel oxide or by impregnation, the two parts of the plate being connected together back-to-back over their entire area and a barrier being incorporated to prevent the flow of electrolyte right through each plate. However, for the negative part of the bipolar plate the expanded metal grids can be of cadmium-plated or zinc-plated expanded copper, iron or steel. Naturally the zinc has to be amalgamated after the formation of the zinc half-plate and this is preferably done before welding to the other half-plate. In each of the electrodes employed to form the bipolar plate a system of interconnected large pores usually having an average pore diameter of about 0.1 to about 0.8 millimeter is provided so as to permit ready access of electrolyte through the electrode. Each of the large pores which correspond in location substantially to the centers of the openings in the expanded metal grids is surrounded by porous active material having an average pore diameter of about 2 to about 30 microns.

Bipolar plates form the walls between the cells, and there must be a liquid-impervious barrier to the flow of electrolyte through each plate, as otherwise a short circuit would result. The barrier itself must be sealed about its edges to the casing material to contain electrolyte completely within the cell. I find that a very satisfactory way of forming this barrier is to consolidate each pack of expanded metal grids into a sheet of nickel. Alternatively, the pack to form the positive part of the plate may be consolidated onto a nickel sheet, and the pack to form the negative part of the plate may be consolidated onto a cadmium or zinc-plated copper sheet, after which the two plates may be bonded together. This bonding may be done with solder or other low melting point alloy, such as Rose's Metal (50% Bi, 25% Pb, 25% Sn), a layer of such alloy, for example, being spread on each sheet and then the two packs pressed together at a temperature just above the melting point of the alloy. Another suitable bonding method is to plate the backsides of the positive and negative parts of the plate with a thin layer of spongy copper which is then washed and dried in a reducing atmosphere. Immediately after drying, the backsides of the parts of the plate are pressed together and spotwelded along their edges and at random over their surfaces. This process can also be applied using other metals such a cadmium which are not readily oxidized in air, and which can easily be plated in thin porous layers.

The biporous negative zinc part of the plate can be prepared as described herein. Once the pack of zinc-coated grids has been formed, the edges of the pack are preferably pressed onto a thin nickel sheet and welded to it by spot welding. The biporous positive nickel part of the plate can be prepared in a number of ways, also as described herein and having a biporous structure wherein the large pores have an average diameter of about 0.4 to about 0.8 millimeter and the fine pores surrounding the large pores have an average pore diameter of about 2 to about 30 microns, and the pack again preferably pressed onto and welded or otherwise bonded together; an end plate for an accumulator can be made by fastening the desired half-plate to a thick nickel-plated copper plate bearing the necessary cable connection by one of the methods previously mentioned.

An accumulator may be made up as follows. A stack is made starting with an end plate, then a plastic distance piece, then a separator, for example, of microporous poly-vinyl chloride sheet sold under the Trade Mark "Porvic" or inorganic zirconylphosphate sheet or other ion exchange material, then a second distance piece, then the first bipolar plate, and so on, until the desired number of cells has been formed and a second end plate completes the stack. The stack is then clamped together and sealed around all sides by filling the spaces between the plate edges with epoxy-resin impregnated glass fiber fabric which is allowed to harden; further layers of resin-impregnated glass fiber fabric may be wrapped around the assembly and cured; finally, vent seats are drilled into each half cell from the top of the accumulator, and the accumulator is ready for the addition of electrolyte, such as the potassium borate lye described in British Pat. specification, No. 470,240, and preliminary charging.

An accumulator with bipolar plates according to the invention offers a number of advantages. The positive and negative compartments of each cell can be separated by any desired form of separator so that, for example, complete or substantially complete retention of $Zn^{2+}$ ions can be arranged with prevention of zinc-dendrite formation. The height of the plates can be less than their width, reducing the danger of accumulation of concentrated zincate solution at the bottom of each cell. Furthermore, the biporous nature of each plate ensures excellent electrochemical penetration into the plate, and the current flow in each cell is always normal to the plane of the plates, ensuring better use of the active material in the plates.

By way of example, 5 mm. thick positive sintered biporous nickel plates are produced from 10 layers of expanded electroformed nickel grids bearing on the faces thereof sintered fine carbonyl nickel powder in the amount of 95 gm./dm². The sintered powder does not fill the interstices in the openings in the nickel grids. The nickel powder is sintered at about 500° C. in a protective atmosphere. Ten sinter-coated grids having dimensions of about 20×30 cm., with a thin electroformed nickel cover having slots 0.3 mm. × 1.9 mm. in rows with the distance between the ends of the slots being 0.4 mm. and the distance between rows being 0.4 mm. placed on top of the pack, are pressed about the edges against a nickel sheet 2 mm. in thickness and having a dimension 28×33 cm. and the whole fastened thereto by spot welding. Six additional spot welds are provided at equally located spots on the faces of the sheet. The pack of grids is placed equidistantly from the edges of the sheet and 2.5 cm. from the bottom edge. The plates are then resintered at 700° C. and are activated anodically in sodium bicarbonate solution and then in potassium carbonate solution. The resulting electrode contains a system of intercommunicating large pores having average diameters of about 0.4 to about 0.8 millimeter, each surrounded by a system of fine pores having an average diameter of about 2 to about 30 microns. The said large pores correspond to approximately the centers of the openings in the initial expanded metal grids. The nickel positive plates have a capacity of 10.5 ampere hours per square decimeter.

An equal number of 3 mm. thick zinc negative plates of the same dimensions are prepared using nine expanded electroformed nickel grids and a thin slotted electroformed nickel cover with each grid bearing zinc sponge in the amount of 30 grams per square decimeter. The grids are pressed against and welded to a 0.2 mm. thick nickel sheet and are then amalgamated. The zinc negative plates have a capacity of about 13 ampere hours per square decimeter. The resulting negative plates were bipolar in nature with a system of intercommunicating large pores of about 0.1 to about 0.4 millimeter in diameter corresponding in location to approximately the centers of the openings in the initial expanded nickel grids and being surrounded by a fine porous system in the active zinc sponge, said fine pores having an average pore diameter of about 2 to about 20 microns, thereby providing a sufficient surplus in capacity as compared to that of the 5 mm. positive nickel plate.

The backsides of the positive and negative plates are sprayed with Rose's Metal, assembled into bipolar plates and soldered together.

A 100 cell battery is prepared from the thus-prepared bipolar plates with positive and negative half-plates at the ends provided with connecting cables as described hereinbefore. The whole is then carefully encased in fiber glass-reinforced epoxy resin, drilled and filled with electrolyte as described hereinbefore. The resulting battery is found to deliver 19,200 watt-hours at the 5-hour rate. Such an accumulator weighs 479 Kg. and has a volume of 203 liters, so that its output is 40 watt-hours per Kg. This figure is favorable when compared with a figure of 29.5 watt-hours per Kg. for a standard 40-cell Ni-Fe accumulator of the same capacity.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. A battery plate consisting of a plurality of electrically conductive expanded metal grids electrically connected in parallel, said grids having finely porous galvanically active metallic material from the group consisting of nickel having a surface of active nickel oxide, zinc, cadmium and cadmium alloys adhering thereto but incompletely filling the openings of the expanded metal grid and said grids being pressed together such that said active material on adjacent grids is in face-to-face contact, and said plate having a dual-porosity structure consisting of a labyrinth of large pores having diameters of about 0.1 to about 0.8 millimeters provided by the incompletely filled openings in the expanded metal grids and of fine pores having an average pore size of about 2 to about 30 microns in the porous metallic material surrounding said large pores and radiating from said large pores, said plate being characterized by a substantially higher proportion of porous metallic material to grid metal in the interior portions thereof than in the exterior portions thereof.

2. A battery plate according to claim 1 wherein the grids have a zinc surface and the porous material is zinc.

3. A battery plate according to claim 1 wherein the grids have a nickel surface and the porous material is nickel having a surface of active nickel oxide.

4. A battery plate according to claim 1 wherein the grids have a cadmium surface and the porous material is selected from the group consisting of cadmium, cadmium alloys with up to 20 percent nickel, and cadmium alloys with small amounts of an element from the group consisting of thallium, selenium and silver.

5. A battery plate according to claim 1 wherein the mean ratio of said large pores to said fine pores is about 40.

6. A battery plate according to claim 4 wherein said large pores have diameters of about 0.2 to about 0.4 millimeter and wherein the average pore size of said fine pores is about 2 to about 20 microns.

7. A battery plate according to claim 4 wherein a protective covering of copper sheet having a plurality of slots and plated with cadmium to give a bellmouth configuration to said slots with said plated sheet being placed upon each side of said plate such that said bellmouth face outwards.

8. A battery plate according to claim 4 wherein the grids are electroformed copper.

* * * * *

UNITED STATES PATENT OFFICE
CERTIFICATE OF CORRECTION

Patent No. 3,647,544   Dated March 7, 1972

Inventor(s) Friedrich August Schneider

It is certified that error appears in the above-identified patent and that said Letters Patent are hereby corrected as shown below:

Col. 5, line 29, for "1,3,4,5,5,4,3" read --1,3,4,5,5,5,4,3--.

Col. 7, line 47, for "into" read --onto--.

Line 65, for "a" read --as--.

Signed and sealed this 24th day of April 1973.

(SEAL)
Attest:

EDWARD M. FLETCHER, JR.
Attesting Officer

ROBERT GOTTSCHALK
Commissioner of Patents